(12) United States Patent
Quehenberger, Sr.

(10) Patent No.: US 8,463,514 B2
(45) Date of Patent: Jun. 11, 2013

(54) METHOD AND APPARATUS FOR THE GENERATION OF A SETTING SIGNAL FOR AN ACTUATOR OF A CLUTCH UNIT OF A MOTOR VEHICLE

(75) Inventor: Johannes Quehenberger, Sr., Saalbach (AT)

(73) Assignee: Magna Powertrain AG & Co KG, Lannach (AT)

( * ) Notice: Subject to any disclaimer, the term of this patent is extended or adjusted under 35 U.S.C. 154(b) by 1009 days.

(21) Appl. No.: 12/151,528

(22) Filed: May 7, 2008

(65) Prior Publication Data

US 2008/0281495 A1 Nov. 13, 2008

(30) Foreign Application Priority Data

May 7, 2007 (DE) .......................... 10 2007 021 303

(51) Int. Cl.
*B60W 10/02* (2006.01)
*G06F 17/00* (2006.01)
*G06F 19/00* (2006.01)

(52) U.S. Cl.
USPC ................. 701/58; 701/68; 701/87; 477/70; 477/78; 477/174

(58) Field of Classification Search
USPC ........... 701/51, 55, 56, 58, 60, 64, 65, 67–71, 701/81, 82, 84, 87–90; 477/34–37, 39, 70, 477/77–79, 86, 89, 87, 166, 174, 176, 179, 477/180
See application file for complete search history.

(56) References Cited

U.S. PATENT DOCUMENTS

| | | | |
|---|---|---|---|
| 4,961,476 A | 10/1990 | Witte et al. | |
| 5,571,060 A * | 11/1996 | Becker et al. | 477/159 |
| 6,647,333 B2 * | 11/2003 | Jager et al. | 701/51 |
| 7,056,262 B2 * | 6/2006 | Amendt et al. | 477/98 |
| 7,125,364 B2 * | 10/2006 | Cring | 477/174 |
| 7,315,776 B2 | 1/2008 | Billig | |
| 7,424,356 B2 * | 9/2008 | Jung et al. | 701/67 |
| 2005/0182532 A1 * | 8/2005 | Tobler et al. | 701/22 |
| 2006/0122757 A1 | 6/2006 | Billig | |
| 2007/0037662 A1 * | 2/2007 | Cring | 477/174 |
| 2007/0255473 A1 * | 11/2007 | Christofl et al. | 701/67 |

FOREIGN PATENT DOCUMENTS

| | | |
|---|---|---|
| DE | 38 11 214 | 10/1989 |
| DE | 103 33 652 | 2/2005 |
| WO | WO 2005/000976 | 2/2005 |
| WO | WO 2005/009776 | 2/2005 |

* cited by examiner

*Primary Examiner* — Thomas Tarcza
*Assistant Examiner* — Edward Pipala
(74) *Attorney, Agent, or Firm* — Dickinson Wright

(57) ABSTRACT

A method and control system for an actuator of a clutch of a motor vehicle includes a main control unit determining a desired value for a torque to be transmitted in dependence on predetermined first parameters. A setting signal for the actuator corresponding to the desired value is generated by an additional control unit on the basis of the determined desired value. A desired value tolerance range for the determined desired value of the torque is determined by the main control unit in dependence on predetermined second parameters. The additional control unit determines an actual value of the torque transmissible by the clutch unit and generates a new setting signal for the actuator when the actual value is outside the desired value tolerance range.

29 Claims, 1 Drawing Sheet

METHOD AND APPARATUS FOR THE GENERATION OF A SETTING SIGNAL FOR AN ACTUATOR OF A CLUTCH UNIT OF A MOTOR VEHICLE

FIELD

The present disclosure relates to a method for the generation of a setting signal for an actuator of a clutch unit of a motor vehicle with which the torque to be transmitted by the clutch unit can be set, with a desired value for the torque to be transmitted being determined by a main control unit in dependence on preset first parameters and with a setting signal corresponding to the desired value being generated for the actuator by an additional control unit based on the determined desired value. The disclosure is furthermore directed to a control apparatus for carrying out the method.

BACKGROUND

The statements in this section merely provide background information related to the present disclosure and may not constitute prior art.

Clutch units may be used, for example, in transfer cases of motor vehicles with which the torque generated by a drive unit is transferred to the individual vehicle wheels as required. For example, in motor vehicles with temporarily connectable all-wheel drive, some of the drive torque is fixedly transferred to the primary drive wheels, whereas a second portion of the drive torque is transferred as required, for example in dependence on corresponding driving dynamic parameters underlying the respective driving situation, to the two other vehicle wheels (i.e., to the secondary drive wheels). Furthermore, such clutch units may also be used for the transfer of the torque between the left hand vehicle wheels and the right hand vehicle wheels, or for any other transfer of a torque.

So-called driving dynamic parameters are usually determined and/or evaluated by the main control unit for the generation of a corresponding setting signal for the actuator. In this connection, it can, for example, be a question of parameters such as vehicle speed, vehicle acceleration, tire slip, speed of the gas pedal actuation, drive torque, steering angle, wheel speed, yaw rate or yaw angle speed, or other parameters influencing the driving dynamics.

A respective desired value for the then current torque to be transmitted is determined by the main control unit based on these first parameters. This desired value is transmitted to the additional control unit, which generates a setting signal corresponding to the desired value for the actuator based on the desired value. The setting signal may, for example, be an angle of rotation of the actuator corresponding to the respective torque to be set or, for example, a corresponding pressure value.

To reduce the number of the setting movements of the actuator occurring on each torque demand, and thus to reduce the thermal strain of the actuator, it is known that a tolerance band for the torque to be set is stored within the additional control unit and a setting procedure of the actuator is only triggered on a minimum change of the desired value (i.e., when the desired value departs from the tolerance band). From the vehicle aspect, a degradation of the torque precision of the system may thereby result by which, however, the driving behavior is not negatively influenced in many driving situations. There are, however, driving situations where very high precision is required for the setting of the torque to be transmitted. Furthermore, the taking into account of a tolerance band within the additional control unit is not flexible since, for example, dynamic driving parameters or dynamic influences in the region of the clutch unit or of the actuator cannot be taken into account.

SUMMARY

The present disclosure provides a method and a control apparatus in which the number of the control procedures of the actuator may be reduced without the driving behavior in critical situations being negatively influenced. It should, furthermore, be possible to take account of the driving dynamics with high precision.

A desired value tolerance range of the torque for the determined desired value may be determined by the main control unit in dependence on preset second parameters. The desired value tolerance range may be transmitted to the additional control unit. The additional control unit may determine an actual value of the torque transmitted or transmissible by the clutch unit and generates a new setting signal for the actuator when the actual value is outside the desired value tolerance range.

A control apparatus in accordance with the disclosure may be characterized in that the main control unit may be designed for the determination of a desired value tolerance range for the determined desired value of the torque in dependence on preset second parameters as well as for the transmission of the desired value tolerance range to the additional control unit. The additional control unit may be designed for the determination of an actual value of the torque transmitted or transmissible by the clutch unit, as well as for the generation of a new setting signal for the actuator when the actual value is outside the desired value tolerance range.

A preset desired value change is thus not compared with a tolerance band stored within the additional control unit, but rather a desired value tolerance range is already determined for this determined desired value of the torque by the main control unit which determines the desired value for the torque to be transmitted in dependence on the preset first parameters. The main control unit thus in each case may dynamically determine, instead of a tolerance band statically preset within the additional control unit, the desired value tolerance range for the just determined desired value in dependence on preset second values and may transmit the determined desired value tolerance range to the additional control unit instead of the determined desired value.

The desired value tolerance range may vary dynamically in this connection, in each case in dependence on the preset second parameters, so that the desired value tolerance range may be adapted in each case by the main control unit. For example, in dependence on the then current driving situation, for each torque demand. Either a wide desired value tolerance range or a very narrow desired value tolerance range may be determined by the main control unit depending on the driving situation and may be transmitted to the additional control unit. This is also in particular advantageous since the required parameters that are relevant to the determination of the respectively required desired value tolerance range are usually already present in the main control unit since they are usually also relevant to the determination of the desired value for the torque to be transmitted.

The additional control unit only compares the actual value of the torque determined by it with the desired value tolerance range transmitted by the main control unit and checks whether the actual value is within the tolerance range. A complex and/or costly determination of a change of the desired torque value is not necessary in this case so that the additional control unit can react very quickly to a new torque demand, with unnecessary setting procedures of the actuator being avoided due to the preset desired value tolerance range.

Upper and lower desired values are transmitted for the transmission of the desired value tolerance range. It is also possible that the determined desired value and an upper and a lower difference value are transmitted for the transmission of the desired value tolerance range. It is also possible in a corresponding manner that the determined desired value as well as an associated bandwidth of the desired value tolerance range are transmitted for the transmission of the desired value tolerance range. It is ensured in all these cases that the additional control unit not only receives a desired torque value, but also a desired value tolerance range for the torque and may check in a simple manner whether the determined actual value is within this tolerance range.

A positional value, for example an angle of rotation of the actuator or a pressure value to be generated by the actuator may be used as the setting signal. In a corresponding manner, a positional value, for example an angle of rotation of the actuator or a pressure value generated by the actuator may be determined for the determination of the actual value of the torque. In particular, when the actuator is made as an electric motor, the transmitted or transmissible torque may be determined by a corresponding angle of rotation of the motor axis or of another part of the actuator chain moving in dependence on the engine axis. In a corresponding manner, a desired torque may be set by setting a preset angle of rotation. The corresponding torque/angle of rotation dependence may be stored in this connection as a characteristic line, for example, in table form or in functional form, within the additional control unit. In a corresponding manner, the actual value of the transmitted or transmissible torque may be determined by detecting an angle of rotation via the torque/angle of rotation dependency. Instead of the position, the pressure generated by the actuator may can be measured, using a pressure sensor for example, and may be converted into a corresponding torque. A desired value to be set for the torque to be transmitted may also be converted in a corresponding manner into a desired pressure and may be set via the actuator. The positional value set forth above only corresponds to an actually transmitted torque when a correspondingly high torque is present at the powertrain. However, since it is generally also possible to measure the actually transmitted torque, the wording "transmitted or transmissible torque" will be used within the framework of this application.

The same parameters may be used at least in part as the first and second parameters. This means that the same parameters may be used at least in part both for the determination of the desired torque value and for the determination of the desired value tolerance range for the determined desired value. They are in particular parameters determined via sensors and other measurements/calculations and characterizing the driving dynamics. If the then current driving situation determined on the basis of these parameters requires a high precision in the torque to be transmitted, the desired value tolerance range may be selected to be very narrow by the main control unit so that the additional control unit sets the torque value with high precision by an increased number of setting procedures due to the narrow set value. If, in contrast, no correspondingly high precision is required in the setting of the torque to be transmitted due to the then current driving situation, the desired value tolerance range may be selected to be very wide by the main control unit so that a new control signal for the actuator is only generated by the additional control unit when the actual value differs very pronouncedly from the desired torque value determined by the main control unit.

However, second parameters different from the first parameters may also be taken into account in the determination of the desired value tolerance range. It is thus possible, for example, that the temperature of the actuator or, for example, the temperature of the clutch unit or of another member contained within the actuator chain between the actuator and the clutch unit is detected and is set in dependence on the temperature o the desired value tolerance range. For example, with a relatively high temperature in the actuator, the desired tolerance value range may be set to be relatively wide to reduce the number of setting procedures of the actuator and thereby to reduce the temperature within the actuator.

The additional control unit determines an actual value tolerance range for the determined actual value and generates a new setting signal for the actuator when the actual value tolerance range is at least partly outside the desired value tolerance range. In particular when the torque is not used directly, but rather a value characterizing the torque such as a positional value of the actuator or a pressure value measured by a pressure sensor is used for the determination of the torque, tolerances present within the actuator chain (i.e., between the actuator and the clutch unit) are to be taken into account. They may, for example, be disposed in the actuator itself or also in a reduction gear unit downstream of the actuator, for example a worm gear, and may under certain circumstances vary over the service life by wear or due to different temperatures.

By using an actual value tolerance range, these tolerances are also taken into account on consideration of the actual value in that it is not the actually detected actual value that is compared with the desired value tolerance range, but the actual value tolerance range. In this connection, a new setting signal may, for example, be generated when the lower limit of the actual value tolerance band falls below the lower limit of the desired value tolerance band or when the upper limit of the actual tolerance band exceeds the upper limit of the desired value tolerance band. When the lower or upper limits of the desired value tolerance band is reached, a respective new setting signal is generated for the actuator to raise or lower the torque to be transmitted. It is advantageous in this connection for the actuator to be actuated for so long until the new actual value comes to lie in the range of the middle of the desired value tolerance band.

It may, however, in particular be advantageous with hydraulic actuator systems subject to leaks to activate the actuator system for so long until the new actual value or the upper limit of the actual value tolerance range has reached the upper limit of the desired value tolerance range to minimize the number of recharge cycles and thus the actuator strain. Due to the leakage present, the torque slowly falls after setting the new actual value until the actual value or the lower limit of the actual value tolerance range has reached the lower limit of the desired value tolerance range and a new setting procedure is triggered to increase the torque.

The actual value tolerance range, in particular the breadth of the actual value tolerance range, is determined dynamically in dependence on preset third parameters. In this connection, the first and/or the second parameters may be used at least in part as the third parameters. The following, non-exclusive parameters are conceivable, for example: oil temperature, temperature of the electric motor, disk strain of the clutch unit, wear and aging, hysteresis and/or difference rotation of the clutch unit.

The main control unit and the additional control unit are made separately from one another. The main control unit may in this connection in particular be provided within a control unit that is provided for other regulating systems for driving dynamics, for example for the ABS system, the EPS system or other regulation systems. It is, however, generally also possible for the main control unit and the additional control unit to be made as one unit.

Further areas of applicability will become apparent from the description provided herein. It should be understood that the description and specific examples are intended for purposes of illustration only and are not intended to limit the scope of the present disclosure.

DRAWINGS

The disclosure will be described in more detail in the following with reference to the drawings.

DETAILED DESCRIPTION

Figure 1:
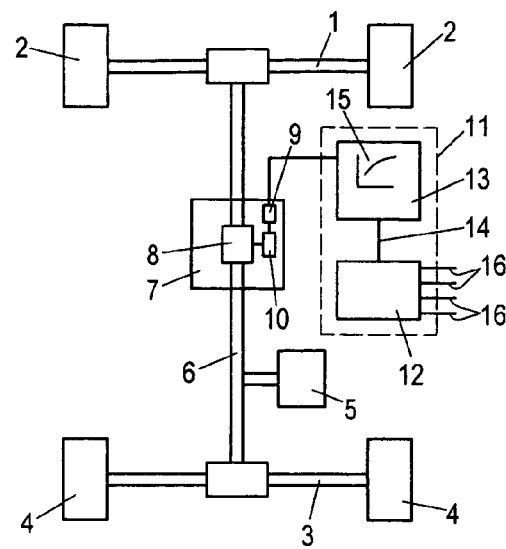
FIG. 1 is a schematic part of a motor vehicle equipped with a control apparatus.

The following description is merely exemplary in nature and is not intended to limit the present disclosure, application, or uses. It should be understood that throughout the drawings, corresponding reference numerals indicate like or corresponding parts and features.

FIG. 1 shows front wheels 2 of a motor vehicle connected to a front axle 1 as well as rear wheels 4 of a motor vehicle connected to a rear axle 3. The motor vehicle furthermore includes a drive unit 5 which comprises, for example, a motor as well as a transmission of the motor vehicle by which a torque may be transmitted permanently to the rear wheels 4 via a central drive shaft 6.

Furthermore, a transfer case 7 is provided via which a torque may additionally be transmitted, as required, from the drive unit 5 to the front wheels 2. A connectable all-wheel drive may thus be realized in this manner.

The transfer case 7 includes a clutch unit 8 which may be actuated via an actuator made as an electric motor 9 and a reduction gear unit 10 made as a worm gear, for example. The torque transmitted by the clutch unit 8 may thus be set by a corresponding actuation of the electric motor 9.

A control apparatus 11, comprising a main control unit 12 and an additional control unit 13, is provided for the control of the transfer case 7. The main control unit 12 and the additional control unit 13 may be made separately from one another in this connection and are connected to one another via a connection line, for example a CAN bus 14.

The electric motor 9 may be controlled by the control apparatus 11 such that a preset torque may be transferred to the front wheels 2 via the clutch unit 8. A setting value of the electric motor 9, in particular an angle of rotation, may be set by the control apparatus 11 for this purpose for example, in accordance with the torque to be transmitted.

To enable a setting of the torque to be transmitted in accordance with such a setting value, a corresponding dependence between the transmissible torque and the setting value of the electric motor 9 is stored, for example, as a characteristic line 15, in the additional control unit 13.

The main control unit 12 includes a plurality of measurement inputs 16 via which a plurality of different first parameters may be detected by the main control unit 12. The parameters may, for example, be parameters relevant to the driving dynamics such as speed, steering wheel angle, tire slip or the like, but also, for example, internal vehicle parameters such as the temperature of the electric engine 9, which may be relevant for a setting of the torque to be transmitted by the transfer case 7.

Depending on the driving situation, a desired value may be determined by the main control unit 12 for the torque, which should be transmitted from the transfer case 7 to the front wheels 2. At the same time, a desired value tolerance range for the determined desired value of the torque may be determined by the main control unit 12 based on at least some of the parameters detected via the measurement inputs 16. This desired value tolerance range is transmitted via the CAN bus 14 as a torque demand to the additional control unit 13, which generates a setting signal for the electric motor 9 for the setting of the desired torque in dependence on the received desired value tolerance range. For this purpose, the additional control unit 13 determines the then current actual value of the torque transmitted or transmissible by the transfer case 7 in that, for example, the then current angle of rotation of the electric engine 9 is detected and is converted via the characteristic line 15 into a current actual torque value.

Subsequently, a check may be made by the additional control unit 13 whether this actual value of the torque is located within the desired value tolerance range transmitted by the main control unit 12. Only when the actual value of the torque is outside the desired value tolerance range is a new setting signal for the electric motor 9 generated by the additional control unit 13 so that the torque to be transmitted is increased or reduced in accordance with the torque demand. If the actual value of the torque is, in contrast, inside the desired value tolerance range, no new setting signal is generated so that the number of setting signals of the actuator 9 is reduced.

Figure 2:
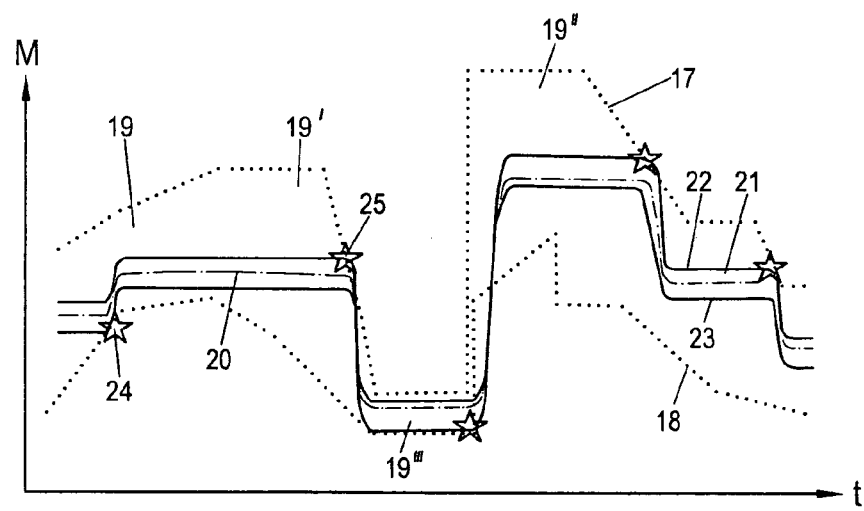
FIG. 2 illustrates an extent of a desired value tolerance range as well as an actual value tolerance range.

In the diagram in accordance with FIG. 2, the torque M is entered over the time t. In this connection, the upper limit of a desired value tolerance range 19 of the torque to be transmitted, which varies over the time t in dependence on the driving situation is shown by a dotted line 17 and the lower limit is shown by a dotted line 18. It may be recognized from FIG. 2 that the breadth of the desired value tolerance range 19, (i.e., in FIG. 2 in each case the perpendicular spacing between the upper limit 17 and the lower limit 18) varies very pronouncedly.

The desired value tolerance range 19 thus, for example, has two very wide sections 19', 19" between which a range 19''' with a very low width is arranged. This means that the observation of a fixedly preset desired torque value is not absolutely necessary in the sections 19' and 19", whereas the torque to be transmitted should be set with high precision in the section 19'''.

The extent of the measured actual value 20 of the transmitted or transmissible torque is shown by a chain dotted line within the desired value tolerance range 19. An actual value tolerance range 21, which is defined by an upper limit 22 and a lower limit 23, is present around the actual value 20.

The actual value tolerance range 21 in this connection represents, for example, the mechanical tolerances which occur by wear within the transfer case 7, for example within the electric motor 9, the reduction gear unit 10 or the clutch unit 8, whereby the dependence between the set value (for example the angle of rotation) and the torque stored in the characteristic line 15 is not completely correct.

The desired value tolerance range 19 is transmitted from the main control unit 12 to the additional control unit 13, which respectively determines the then current actual value 20 of the torque and determines the actual value tolerance range 21 based on the measured actual value 20. A check is furthermore made by the additional control unit 13 whether the actual value tolerance range 21 is at least partly outside the desired value tolerance range 19. In this case, a new setting signal for the electric motor 9 is generated by which the actual value 20 or the actual value tolerance range 21 again comes to lie completely within the desired value tolerance range 19.

For example, the actual value tolerance range 21 in FIG. 2 is first initially located completely within the desired value tolerance range 19 until, at the point 24, the lower limit 23 of the actual value tolerance range 21 reaches and falls below the lower limit 18 of the desired value tolerance range 19. At this moment, a new setting signal for the electric motor 9 is generated by the additional control unit 13 by which the transmitted or transmissible torque is increased for so long until the measured actual value 20 comes to lie, for example, approximately in the middle of the desired value tolerance range 19. The value of the transmitted or transmissible torque is now maintained for so long until, at the point 25, the upper limit 22 of the actual value tolerance range 21 reaches the upper limit 17 of the desired value tolerance range 19 and exceeds it. At this moment, a new setting signal is generated by the additional control unit 13 for the electric motor 9 by which the transmitted or transmissible torque is reduced until the measured actual value 20 again extends approximately at the center of the desired value tolerance range 19.

The actual value 20 or the actual value tolerance range 21 is continuously maintained within a preset desired value tolerance range 19, with the desired value tolerance range 19 being able to be set as very narrow or very wide depending on the driving situation. The number of the setting procedures of the electric motor 9 can thereby be minimized over the total control time, with a very precise setting of the torque simultaneously being possible as required.

Figure 3:
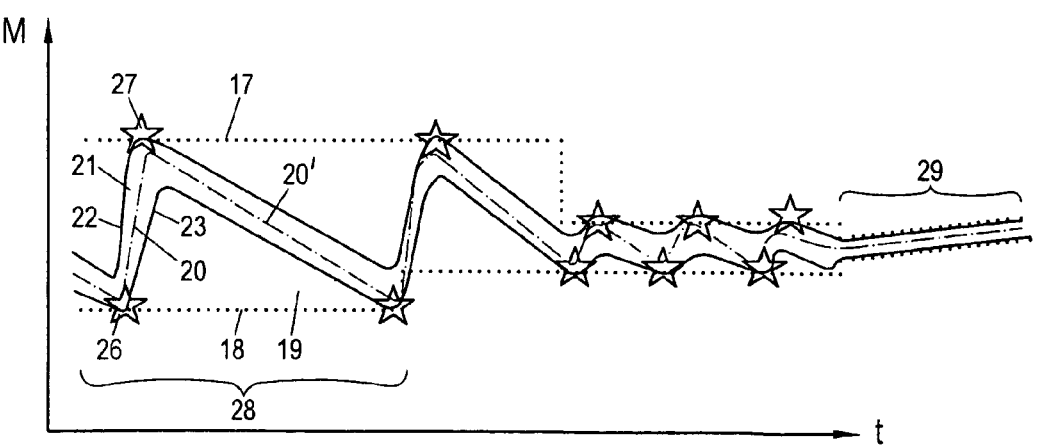
FIG. 3 illustrates a further extent of a desired value tolerance range and of an actual value tolerance range.

In FIG. 3, the actuator to be controlled is not made as an electric motor 9 as in FIG. 2, but as a hydraulic actuator system subject to leaks. The actual value 20 and the actual value tolerance range 21 accordingly extend in the first region of FIG. 3 in sawtooth shape between the upper limit 17 and the lower limit 18 of the desired value tolerance range 19.

After the lower limit 23 of the actual value tolerance range 21 has reached or fallen below the lower limit 18 of the desired value tolerance range 19 at the point 26 due to the leaking present, a new setting signal is output to the hydraulic actuator system so that the torque is increased for so long until the upper limit 22 of the actual value tolerance range 21 has reached the upper limit 17 of the desired value tolerance range 19 at the point 27. At this time, a new setting signal is output by the additional control unit 13 to the hydraulic actuator system, whereby the pump of the actuator system is shut down to keep the pressure and thus the torque to be transmitted constant.

The measured actual value 20 drops in the section 20' due to the leaking present until the lower limit 23 of the actual value tolerance range 21 has reached the lower limit 18 of the desired value tolerance range 19 or has fallen below it. Only at this time is a new setting signal for the hydraulic actuator system given by the additional control unit 13 by which the corresponding pressure and thus the transmitted or transmissible torque are again increased. The number of the recharge cycles and thus the actuator strain may thus be minimized due to the very wide desired value tolerance range 19 in the left hand section 28 of FIG. 3.

In the section 29 of FIG. 3 shown at the right, in contrast, the width of the desired value tolerance range 19 is selected to be very low to achieve a high precision of the transmitted or transmissible torque. In this section, the control apparatus attempts to follow the preset narrow desired value tolerance range 19 with high precision to maintain the actual value tolerance range 21 within the narrow desired value tolerance range 19, which makes a correspondingly frequent actuation of the actuator system necessary.

Depending on the driving situation, a high precision of the transmitted or transmissible torque may thus be achieved with the method in accordance with the disclosure and with the control apparatus in accordance with the disclosure, on the one hand. On the other hand, the number of the setting procedures of the actuator system required in total and thus the actuator strain are minimized.

What is claimed is:

1. A method for controlling an actuator of a clutch unit in a power transmission device of a motor vehicle, the method comprising:
   determining a desired value of torque to be transmitted with a main control unit in dependence on preset first parameters;
   determining a setting signal for the actuator with an additional control unit based on the determined desired value;
   determining a desired value tolerance range for the determined desired value of torque with the main control unit in dependence on preset second parameters;
   transmitting the determined desired value and an associated bandwidth for the desired value tolerance range to the additional control unit;
   determining with the additional control unit an actual value of torque transmissible by the clutch unit; and
   generating a new setting signal for the actuator when the actual value is outside the desired value tolerance range.

2. The method in accordance with claim 1, wherein upper and lower desired values are transmitted for the transmission of the desired value tolerance range.

3. The method in accordance with claim 1, wherein the determined desired value and an upper and a lower difference value are transmitted for the transmission of the desired value tolerance range.

4. The method in accordance with claim 1, wherein one of an angle of rotation of the actuator and a pressure value to be generated by the actuator is used as the setting signal.

5. The method in accordance with claim 1, wherein one of an angle of rotation of the actuator and a pressure value generated by the actuator is determined for the determination of the actual value of the torque.

6. The method in accordance with claim 1, wherein the same parameters are used at least in part as the first and second parameters the preset second parameters having one or more parameters mutually exclusive of the parameters which comprise the present first parameters.

7. The method in accordance with claim 1, wherein parameters characterizing the dynamic driving properties of the vehicle are used as the first parameters.

8. The method in accordance with claim 1, wherein the additional control unit determines an actual value tolerance range for the determined actual value and generates a new setting signal for the actuator when the actual value tolerance range is at least partly outside the desired value tolerance range.

9. The method in accordance with claim 8, wherein a width of the actual value tolerance range is determined dynamically in dependence on predetermined third parameters.

10. The method in accordance with claim 9, wherein the first and the second parameters are used at least in part as the third parameters.

11. A power transmission device for a vehicle drivetrain, comprising:
   a first rotatable shaft;
   a second rotatable shaft;

a clutch for selectively transferring torque between the first and second shafts;

an actuator for providing an apply force to the clutch; and a control system for generating a setting signal for the actuator to set a magnitude of torque to be transmitted by the clutch, the control system including a first control unit to determine a desired clutch torque range based on a set of predetermined parameters and a second control unit to determine an actual value of transmissible torque and a new setting signal for the actuator when the actual value is outside the desired clutch torque range.

12. The power transmission device of claim 11 wherein the second control unit determines an actual value tolerance range and determines the new setting signal when the actual value tolerance range lies outside the desired clutch torque range.

13. The power transmission device of claim 12 wherein the set of predetermined parameters includes parameters characterizing dynamic driving properties of a vehicle.

14. The power transmission device of claim 12 wherein the second control unit is operable to dynamically determine a width of the actual value tolerance range based on another set of parameters.

15. The power transmission device of claim 14 wherein the another set of parameters includes a parameter related to an operating characteristic of the actuator.

16. The power transmission device of claim 11 wherein the first control unit is operable to provide a desired clutch torque value as well as an upper and a lower difference value to the second control unit.

17. The power transmission device of claim 11 wherein the setting signal includes one of an angle of rotation of the actuator and a pressure value to be generated by the actuator.

18. The power transmission device of claim 11 wherein the second control unit is operable to determine one of an angle of rotation of the actuator and a pressure value generated by the actuator for the determination of the actual value.

19. A power transmission device for a vehicle drivetrain, comprising:

a first rotatable shaft;

a second rotatable shaft;

a clutch for selectively transferring torque between the first and second shafts;

an electric motor for providing torque to a gear reduction unit, an output of the gear reduction unit providing an apply force to the clutch;

a first control unit to determine a desired clutch torque range based on a set of predetermined parameters; and a second control unit in communication with the first control unit for storing an initial setting signal to set a magnitude of torque to be transmitted by the clutch and to determine an actual value of transmissible torque based on a measured angle of rotation of the electric motor, the second control unit determining a new setting signal for the electric motor when the actual value is outside the desired clutch torque range.

20. The power transmission device of claim 19 wherein the second control unit stores a predetermined torque versus angle of rotation relationship.

21. The power transmission device of claim 19 wherein the second control unit determines an actual value tolerance range and determines the new setting signal when the actual value tolerance range lies outside the desired clutch torque range.

22. The power transmission device of claim 21 wherein the second control unit is operable to dynamically determine a width of the actual value tolerance range based on another set of parameters.

23. A control apparatus for the generation of a setting signal for an actuator of a clutch unit of a motor vehicle, with which the torque to be transmitted by the clutch unit can be set, having a main control unit for the determination of a desired value for the torque to be transmitted in dependence on preset first parameters and having an additional control unit for the generation of a corresponding setting signal for the actuator based on the determined desired value, wherein the main control unit is designed for the determination of a desired value tolerance range for the determined desired value of the torque in dependence on preset second parameters as well as for the transmission of the desired torque value and the desired value tolerance range to the additional control unit; and in that the additional control unit is designed for the determination of an actual value of the torque transmitted or transmissible by the clutch unit as well as for the generation of a new setting signal for the actuator when the actual value is outside the desired value tolerance range.

24. The control apparatus in accordance with claim 23, wherein the main control unit and the additional control unit are made separately from one another.

25. The control apparatus in accordance with claim 23, wherein the actuator is made as an electrically or hydraulically actuable actuator, in particular as an electric motor.

26. The control apparatus in accordance with claim 23, wherein the clutch unit is part of a transfer case, of a blockable differential transmission, of an all-wheel clutch or of a transmission for active torque vectoring, with which a torque generated by a drive unit can be transferred to the front wheels and/or rear wheels and/or to two wheels of an axle of the motor vehicle.

27. A method for controlling an actuator of a clutch unit in a power transmission device of a motor vehicle, the method comprising:

determining a desired value of torque to be transmitted with a main control unit in dependence on preset first parameters;

determining a setting signal for the actuator with an additional control unit based on the determined desired value;

determining a desired value tolerance range for the determined desired value of torque with the main control unit in dependence on preset second parameters;

transmitting the desired value of torque and the desired value tolerance range, including an upper and a lower difference value for the desired tolerance range, to the additional control unit;

determining with the additional control unit an actual value of torque transmissible by the clutch unit;

generating a new setting signal for the actuator when the actual value is outside the desired value tolerance range;

determining with the additional control unit an actual value tolerance range for the determined actual value of torque; and generating a new setting signal for the actuator when the actual value tolerance range is at least partly outside the desired value tolerance range.

28. The method in accordance with claim 27, wherein the preset second parameters having one or more parameters mutually exclusive of the parameters which comprise the present first parameters.

29. A method for controlling an actuator of a clutch unit in a power transmission device of a motor vehicle, the method comprising:
- determining a desired value of torque to be transmitted with a main control unit in dependence on preset first parameters;
- determining a setting signal for the actuator with an additional control unit based on the determined desired value;
- determining a desired value tolerance range for the determined desired value of torque with the main control unit in dependence on preset second parameters;
- transmitting the determined desired value and the desired value tolerance range, including an upper and lower desired values, to the additional control unit;
- determining with the additional control unit an actual value of torque transmissible by the clutch unit; and
- generating a new setting signal for the actuator when the actual value is outside the desired value tolerance range.

* * * * *